March 22, 1966     L. A. MINTER     3,242,275
AUTOMATICALLY ACTUATED TIMING MECHANISM FOR VENDING MACHINES
Filed Feb. 20, 1963
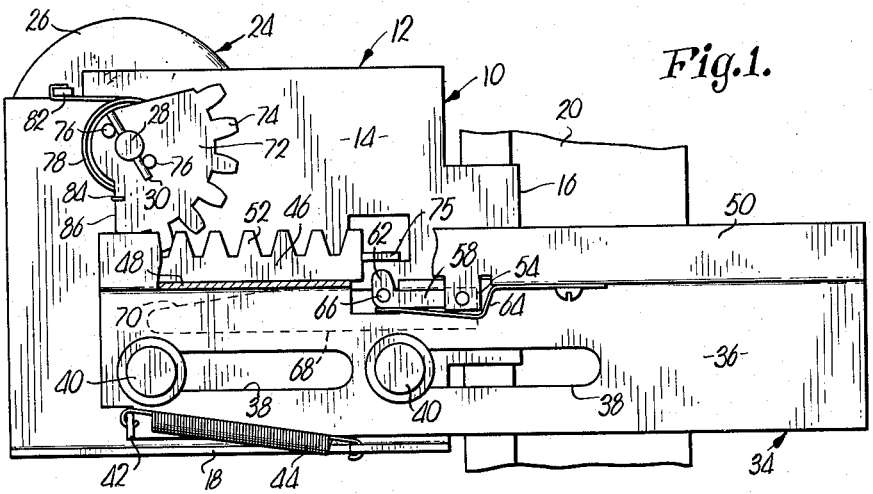
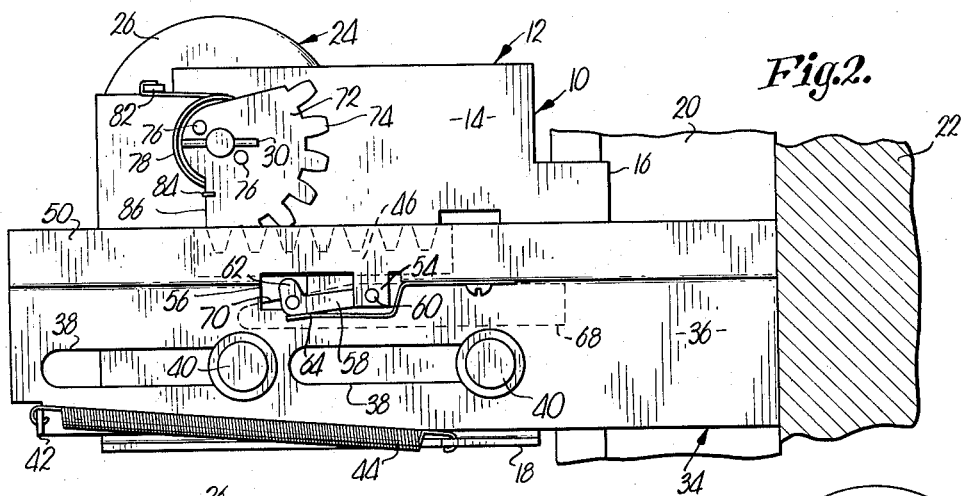
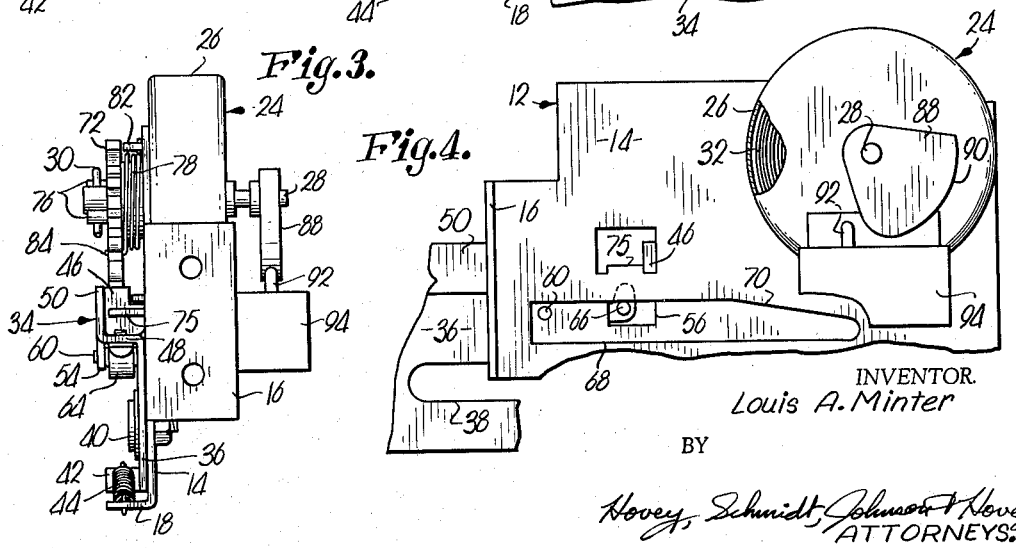
INVENTOR.
Louis A. Minter
BY
Hovey, Schmidt, Johnson & Hovey
ATTORNEYS.

United States Patent Office 3,242,275
Patented Mar. 22, 1966

3,242,275
AUTOMATICALLY ACTUATED TIMING MECHANISM FOR VENDING MACHINES
Louis A. Minter, Independence, Mo., assignor to The Vendo Company, Kansas City, Mo., a corporation of Missouri
Filed Feb. 20, 1963, Ser. No. 259,843
10 Claims. (Cl. 200—35)

This invention relates to vending equipment and particularly to automatically actuated timing mechanism adapted to prevent deactivation of the vend mechanism of the machine where the interior of the cabinet is maintained in a hot or cold condition, even though the interior of the cabinet is permitted to move above or below a required temperature during servicing, thereby otherwise causing the machine to be inoperable because of health code thermostatically controlled mechanism operably associated with the vend structure.

Public health laws in many jurisdictions require mechanism in vending machines designed to handle spoilable food products, to disable the machine from making further sales should the temperature in the food storage compartment rise above about 50° F. in the case of refrigerated foods, or fall below approximately 150° F. where the food is held in a hot condition. This is for the reason that if the refrigeration or heating system should fail, the sale of food products having a possibly dangerously high bacterial count is precluded. Manufacturers of vending equipment have met the requirements of these laws by equipping machines adapted for maintaining food products in a hot or cold condition, with a thermostat operated switch which is in series with the coin mechanism in order to disable the latter should the temperature in the cabinet vary beyond a preselected maximum or minimum value respectively. It can be recognized however, that during servicing of these machines with fresh products, the temperature in the cabinet will usually change sufficiently to cause operation of the thermostatically controlled switch, with the degree of change of temperature in the cabinet and the rapidity of such change being dependent upon the existing ambient temperature. However, upon completion of servicing of the machine and closing of the service door, the refrigeration or heating system will return the temperature of the cabinet back to a normal level in a sufficiently short period of time to obviate the possibility of deleterious bacterial growth in the food.

It is therefore desirable that some type of mechanism be provided on the machine to prevent disablement of the coin controlled mechanism by the thermostatically operated switch during the relatively short period of return of the cabinet temperature to a required level immediately following servicing of the unit. Heretofore, deactivation of the vend mechanism by the thermostatically controlled switch has been prevented by using a manually operable timer associated with the switch which will maintain the latter inactivated for a predetermined interval following servicing of the machine. The serviceman grasps the operating knob of the timer mechanism and rotates the latter through a required arc immediately prior to closing of the door of the machine whereby mechanism operated by the timer maintains the thermostatically controlled switch closed until after the heating or refrigeration system in the cabinet has an opportunity to bring the temperature of the cabinet back to a required level. However, it has been found that many servicemen are careless or forgetful of the necessity to manually initiate operation of the timer after servicing of the machine and prior to closing of the main door, and as a consequence, the machine will be incapacitated with a subsequent loss of sales over an extended period.

Therefore, it is the primary object of the present invention to provide automatically actuated apparatus for maintaining the thermostatically controlled switch operably associated with the coin controlled unit, in operable for a period immediately following servicing of the machine so that the interior of the cabinet thereof may be brought back to a selected temperature level prior to return of the thermostatically controlled switch to an actuatable condition.

A further important object of the invention is to provide a simple, efficient and effective timer mechanism capable of preventing the thermostatically controlled switch of the machine from deactivating the coin controlled unit of the vending apparatus, which is actuated by the servicemen closing the door of the machine to thereby assure initiation of operation of the timer each time the machine is serviced.

Also an important object of the invention is to provide timer mechanism capable of performing the functions set forth above which is of the spring operated type requiring rotation of an input shaft to initiate operation of the timer wherein automatic rotation of the input shaft is effected by the action of the serviceman closing the door of the machine, through the medium of novel rack and gear means operably associated with the timer, and with a carriage located within the path of travel of the door during closing thereof so that the gear will be rotated by the rack to wind the time and initiate operation thereof, each time the machine is serviced and requiring no attention by the serviceman whatsoever.

In the drawing:

FIGURE 1 is a side elevational view of automatically actuated timing mechanism for a vending machine constructed in accordance with the preferred principles of the present invention and illustrating the normal disposition of the same on a frame member of the vending machine cabinet, and with certain portions of the mechanism being broken away and in section to more clearly illustrate the details of the structure;

FIG. 2 is a side elevational view similar to FIG. 1 but illustrating the location of the components when the door of the machine is closed;

FIG. 3 is an end elevational view of the automatically actuated timing mechanism, looking from the right-hand side of the structure as shown in FIG. 2; and FIG. 4 is a fragmentary, side elevational view of the opposite side of the mechanism from that shown in FIGS. 1 and 2.

Automatically actuated timing mechanism for a vending machine is broadly designated 10 in the drawings and includes a generally L-shaped main frame 12 provided with a normally upright, planar section 14, a laterally extending, rectangular leg 16 integral with the left-hand upright margin of section 14 viewing FIG. 4, and an outturned, generally horizontal leg 18 integral with the lower margin of section 14. The leg 16 is adapted to be secured to the generally transversely L-shaped, upright frame member or bulkhead 20 of a vending machine cabinet adjacent the opening normally closed by a swingable door 22 permitting access to the interior of the machine for serving purposes.

A timer broadly designated 24 has a circular casing 26 carried by the rear face of section 14 of frame 12, and is provided with an operating shaft 28 extending outwardly from opposite sides of casing 26 with one end thereof projecting through section 14 of frame 12. Crossbar 30 through the end of shaft 28 projecting from section 14, is in spaced relationship from frame 12 as is clear in FIG. 3. Means for rotating shaft 28 in a direction to wind the spring 32 within casing 26, includes an elongated carriage 34 reciprocably carried on the section 14 of frame 12. Carriage 34, which is generally Z-shaped in cross-sectional configuration, has a main, upright, elongated planar segment 36 provided with a pair of parallel, aligned slots 38 therein which clear corresponding mounting units 40 secured to section 14 as shown in FIGS. 1 and 3. The mounting units 40 cooperate with slots 38 to limit carriage 34 to a rectilinear path of travel below shaft 28. An outwardly directed tab 42 at the lower left-hand corner of carriage 34 as shown in FIG. 1, receives one end of a coil spring 44 which is also suitably connected to the leg 18 of frame 12 for biasing the carriage 34 in a direction out of the cabinet of the vending machine.

The upper margin of carriage 34 is defined by a generally horizontal, elongated leg 48 integral with the upper marginal zone of segment 36 and projecting away from section 14, as well as by an upright elongated leg 50 integral with the outer margin of leg 48. An elongated rack 46 having a series of upwardly facing teeth 52 is positioned in the trough presented by legs 50 and 48, and the outer surface of section 14 of frame 12, for rectilinear movement therealong.

Ear 54 extending into the irregular opening 56 in segment 36 of carriage 34, and integral with the latter, pivotally carries an elongated dog 58 through the medium of horizontal pivot pin 60. An upright, upwardly extending push leg 62 on the extremity of dog 58 remote from pivot pin 60, is adapted to be normally positioned in alignment with the rack 46 to shift the latter during reciprocation of carriage 34. Leaf spring 64 of irregular longitudinal configuration, and secured to the underface of leg 48 of carriage 34, normally biases dog 58 into the disposition thereof shown in FIG. 1. A cam pin 66 carried by the leg 62 of dog 58 and projecting laterally therefrom toward frame 12, is received within an elongated cam slot 68 in section 14 of frame 12. Slot 68 is defined in part by an inclined cam surface 70 of section 14 which operates to cam dog 58 beneath rack 46 after carriage 34 has moved a predetermined distance to the left during closing of door 22.

A gear element 72 rotatable on shaft 28 between crossbar 30 and section 14, has a series of teeth 74 on the periphery thereof complementally engageable with the teeth 52 of rack 46 during reciprocation of the latter by carriage 34. The pins 76 projecting outwardly from the outer surface of gear element 72 in disposition to engage crossbar 30 on opposite sides thereof, cause shaft 28 to be rotated with gear element 72 during reciprocable movement of rack 46. Outwardly bent tab 75 integral with section 14 of frame 12 limits reciprocable movement of rack 46 in a direction away from gear element 72. A coil spring 78 surrounding shaft 28 between gear element 72 and section 14 is provided with a leg 80 connected to a laterally extending tab 82 integral with the upper margin of section 14, as well as a leg 84 engageable with the margin 86 of gear element 72 as shown in FIGS. 1 and 2. The spring 78 serves to bias gear element 72 in a counterclockwise direction when looking at the front face of mechanism 10.

Cam 88 carried by the rear extremity of shaft 28 has an outer cam surface 90 thereon adapted to operably engage a shiftable member 92 forming a part of switch components 94 which are operably coupled to the coin controlled unit within mechanism 10. It is to be understood that the switch components 94 are of the thermostatically operated type so that the switch opens whenever the temperature in the cabinet of the machine varies a predetermined increment from a selected value. Depression of the member 92 operates to maintain the switch in a closed condition and since the latter is in series with the vend switch of the coin operated unit of the machine, the thermostatic elements of components 94 cannot open the switch during the interval that member 92 is depressed. It should be pointed out at this juncture that the cam arrangement illustrated for operating components 94, are schematic only, and that various types of mechanisms may be employed without departing from the scope of the present invention.

In operation, the relative positions of the components when the door 22 of the vending machine is closed, are shown in FIG. 2. Thus, when the serviceman opens door 22, spring 44 shifts carriage 34 to the right as the cam pin 76 rides along inclined cam surface 70, and thence along the upper cam surface of slot 68 to cause the dog 58 to shift into the location of the same shown in FIG. 1 under the influence of leaf spring 64. The gear unit 72, rack 46 and crossbar 30 will then be in the relative locations of the same also shown in FIG. 1.

After completion of servicing of the machine, the serviceman then closes door 22, and since the carriage 34 projects outwardly of the opening normally closed by door 22, shifting of the latter causes the inner surface thereof to engage the outer extremity of carriage 34 and shifts the latter to the left against the action of spring 44. During inward reciprocation of carriage 34, leg 62 of dog 58 engages the proximal extremity of rack 46 and shifts the latter in the trough defined by legs 48 and 50 along with carriage 34. Shifting movement of rack 46 to the left as shown in FIG. 1 effects rotation of gear element 72 in a clockwise direction whereby the pins 76 thereon engage crossbar 30 and rotate shaft 28 in a direction to wind the spring 32 of timer 24.

As the carriage 34 is shifted inwardly during closing of door 22, the cam pin 66 eventually moves onto the cam surface 70 of slot 68, causing the dog 58 to be cammed below rack 46. In this manner, the spring 78 is operable to return the gear element 72 to the initial disposition thereof as the rack 46 is shifted into engagement with tab 75. In this way, the pins 76 are moved out of the path of travel of the crossbar 30 so that shaft 28 is free for reverse rotation under the influence of spring 32 at a timed rate regulated by the internal mechanism of timer 24.

Rotation of the shaft 28 by gear element 72 and rack 46, as described above, moves the cam 88 along an angular path of travel to depress the member 92 of switch components 94 and thereby maintain the thermostatically controlled switch in a closed condition throughout the period of operation of timer 24. As soon as the shaft 28 has been returned to the initial location thereof, the cam surface 90 of cam 88 will clear member 92 as illustrated in FIG. 4 so that the thermostatic elements may again control the condition of the health code switch to deactivate the vend mechanism if the temperature in the vending machine cabinet changes a predetermined increment from a set value.

Having thus described the invention what is claimed as new and desired to be secured by Letters Patent is:

1. In a vending machine provided with a housing having a movable closure, coin actuated control structure, and thermostatically operated components within the housing for deactivating said structure when the temperature within the housing varies a selected increment from an established value, the combination with said housing, structure and components of mechanism for inactivating said thermostatically operated components for a predetermined interval after opening of the closure of the housing, and comprising:

a frame adapted to be mounted within the housing adjacent the closure therefor;

a timing device on the frame and provided with a member for initiating operation of the device in response to shifting of the member from a first position to a second position, said timing device being continuously operable after initiation of operation thereof for said predetermined interval;

means operated by said timing device for maintaining said components inoperable to deactivate said structure during the interval of operation of said device;

a carriage mounted on the frame and movable from an outer location to be engaged and shifted by the closure during closing thereof, to an inner location when the closure is closed;

means connected to the carriage and the frame for biasing the carriage toward said outer location thereof;

a rack shiftably mounted on said frame adjacent the member;

a gear element rotatably carried by the timing device and engageable with the member for shifting the latter from said first position thereof to said second position of the same in response to rotation of the gear element in one direction, said rack being in operable engagement with the gear element; and dog means on the carriage and engageable with the rack for shifting the latter along a path to rotate the gear element in said one direction in response to shifting of the carriage from said outer location to said inner location thereof by the closure during closing of the same.

2. Mechanism as set forth in claim 1 wherein said dog means and the frame are provided with mutually cooperatble cam means thereon for shifting the dog means out of operable engagement with the rack after the latter has been shifted through a path of travel by the carriage sufficient to rotate the gear element through an angular path to shift the member from said first position thereof to said second position of the same.

3. Mechanism as set forth in claim 1 wherein said timing device is spring operated, said member being operable to wind the spring of the device during movement from the first position thereof to said second position of the same.

4. Mechanism as set forth in claim 3 wherein said device is provided with a casing and said member comprises a rotatable shaft projecting from the casing and having a transversely extending crossbar on the outer extremity thereof remote from said casing, said gear element being rotatably positioned on said shaft and provided with pin means thereon positioned to engage said crossbar during rotation of the gear element relative to said shaft.

5. Mechanism as set forth in claim 4 wherein is provided a coil spring on said shaft and provided with legs thereon engaging the frame and said gear element respectively for biasing the latter in a direction opposite to said one direction of rotation of the gear element.

6. Mechanism as set forth in claim 5 wherein said pin means on the gear element are located in a position permitting free rotation of the gear element and thereby shifting of the rack under the influence of said coil spring with the gear element being rotated in a direction opposite to said direction of rotation thereof upon disengagement of the dog means from said rack whereby the shaft may then be rotated in a direction opposite to said one direction by the device.

7. Mechanism as set forth in claim 6 wherein is provided stop means on the frame for limiting movement of the rack away from said shaft by the gear element being rotated in said opposite direction by said coil spring.

8. Mechanism as set forth in claim 1 wherein is provided cam means on said shaft and adapted to engage an operating element of said components for rendering the latter inoperable to deactivate the structure during a substantial portion of the angular path of travel of the cam means on said shaft.

9. Mechanism as set forth in claim 1 wherein said dog means includes an elongated dog pivotally mounted at one extremity thereof on the carriage in alignment with said rack, a leaf spring carried by the carriage and engaging the free extremity of the dog for normally maintaining said free extremity in alignment with the rack during shifting of the carriage in response to closing of the closure, and cam means on the dog and said frame respectively for camming the dog out of engagement with the rack after the gear element has been rotated by the rack through an angular path to shift the member from said first position to the second position thereof.

10. Mechanism as set forth in claim 9 wherein said cam means on the dog and said frame comprises a cam pin carried by said free extremity of the dog and projecting laterally therefrom in a direction toward the frame, said frame being provided with an elongated cam slot therein in underlying relationship to the path of travel of the rack and receiving said cam pin, said cam slot being defined in part by a downwardly facing, inclined cam margin adjacent the gear element and disposed to cam the dog out of engagement with the rack as the cam pin rides along said inclined margin.

References Cited by the Examiner

UNITED STATES PATENTS

| 2,503,736 | 4/1950 | Hodges | 185—38 |
| 2,647,361 | 8/1953 | Goodman | 185—39 |

BERNARD A. GILHEANY, *Primary Examiner.*